(12) United States Patent
Schiller et al.

(10) Patent No.: US 8,832,728 B2
(45) Date of Patent: Sep. 9, 2014

(54) LOGICAL CONTENT AD INSERTION

(75) Inventors: Jay B. Schiller, Denver, CO (US);
Joseph R. Matarese, Portland, OR (US)

(73) Assignee: ARRIS Enterprises, Inc., Suwanee, GA (US)

(*) Notice: Subject to any disclaimer, the term of this patent is extended or adjusted under 35 U.S.C. 154(b) by 1922 days.

(21) Appl. No.: 11/209,699

(22) Filed: Aug. 24, 2005

(65) Prior Publication Data

US 2007/0055983 A1   Mar. 8, 2007

(51) Int. Cl.
*H04N 7/10* (2006.01)
*H04N 7/025* (2006.01)
*H04N 21/2362* (2011.01)
*H04N 21/845* (2011.01)
*H04N 21/81* (2011.01)
*H04N 21/234* (2011.01)
*H04N 21/262* (2011.01)

(52) U.S. Cl.
CPC ......... *H04N 21/812* (2013.01); *H04N 21/2362* (2013.01); *H04N 21/8455* (2013.01); *H04N 21/23424* (2013.01); *H04N 21/26258* (2013.01)
USPC .................... 725/32; 725/34; 725/35; 725/36

(58) Field of Classification Search
USPC ............................................... 725/32, 34–36
See application file for complete search history.

(56) References Cited

U.S. PATENT DOCUMENTS

| | | | |
|---|---|---|---|
| 5,652,615 A * | 7/1997 | Bryant et al. .................... 725/35 |
| 6,909,743 B1 * | 6/2005 | Ward et al. ............... 375/240.01 |
| 2003/0149975 A1 * | 8/2003 | Eldering et al. ................ 725/34 |
| 2005/0015816 A1 * | 1/2005 | Christofalo et al. .......... 725/136 |
| 2007/0171903 A1 * | 7/2007 | Zeng et al. .................... 370/389 |

* cited by examiner

*Primary Examiner* — Robert Hance
(74) *Attorney, Agent, or Firm* — Troy A. Van Aacken (57) ABSTRACT

A method may include and/or involve identifying a received signal as an indication that advertising content should be provided, determining ad content to provide in response to the signal, specifying a playlist file as a file to provide the ad content, the playlist file including identifications of multiple digital content files including the ad content, and streaming the multiple content files as a Single Program Transport Stream.

18 Claims, 8 Drawing Sheets

LOGICAL CONTENT AD INSERTION

TECHNICAL FIELD

The present disclosure relates to digital program insertion.

BACKGROUND

Television signals delivered to viewers generally include the television programs themselves and commercial advertisements, which are typically inserted into breaks that occur regularly during broadcasts of the television programs. The commercial advertisements are typically created and stored separately from the programs. Then, at appropriate times during a broadcast, the commercial advertisements are spliced into the video feed so as to deliver the advertisements to viewers during program breaks. This provides flexibility for changing the commercial advertisements to be played during a program. Some commercials are inserted at the broadcast origination point by the TV network and others are inserted further downstream by the TV service distributor, such as the cable operator. For example, various different advertisements directed to local audiences may be inserted into a program that is broadcast over a much wider geographical area. As another example, different advertisements may be used during a rebroadcast of a program than when the program was originally broadcast. Thus, an important aspect of television delivery is program splicing and, more particularly, ad insertion.

SUMMARY

The following summary is intended to highlight and introduce some aspects of the disclosed embodiments, but not to limit the scope of the claims. Thereafter, a detailed description of illustrated embodiments is presented, which will permit one skilled in the relevant art to make and use various embodiments.

A method may include and/or involve identifying a received signal as an indication that advertising content should be provided, determining ad content to provide in response to the signal, specifying a playlist file as a file to provide the ad content, the playlist file including identifications of multiple digital content files comprising the ad content, and streaming the multiple content files as a Single Program Transport Stream. Streaming the multiple content files as a Single Program Transport Stream may include and/or involve signaling a stream splicer with an identification of the playlist file, receiving from the splicer a request to stream the playlist file, and in response providing to the splicer the Single Program Transport Stream including the ad content from the multiple digital content files.

The method may include and/or involve detecting an ad insertion location in a digital program stream, specifying at least one playlist as a file or files including ad content to splice into the digital program stream at the ad insertion location, and in response to an indication to stream the playlist file or files, streaming a Single Program Transport Stream including content from multiple files referenced by the playlist file or files, the multiple files including the ad content to splice into the digital program stream.

Other system/method/apparatus aspects are described in the text (e.g., detailed description and claims) and drawings forming the present application.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

References to "one embodiment" or "an embodiment" do not necessarily refer to the same embodiment, although they may.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list.

"Logic" refers to signals and/or information that may be applied to influence the operation of a device. Software, hardware, and firmware are examples of logic. Hardware logic may be embodied in circuits. In general, logic may comprise combinations of software, hardware, and/or firmware.

Digital Program Insertion (DPI) System

Figure 1:
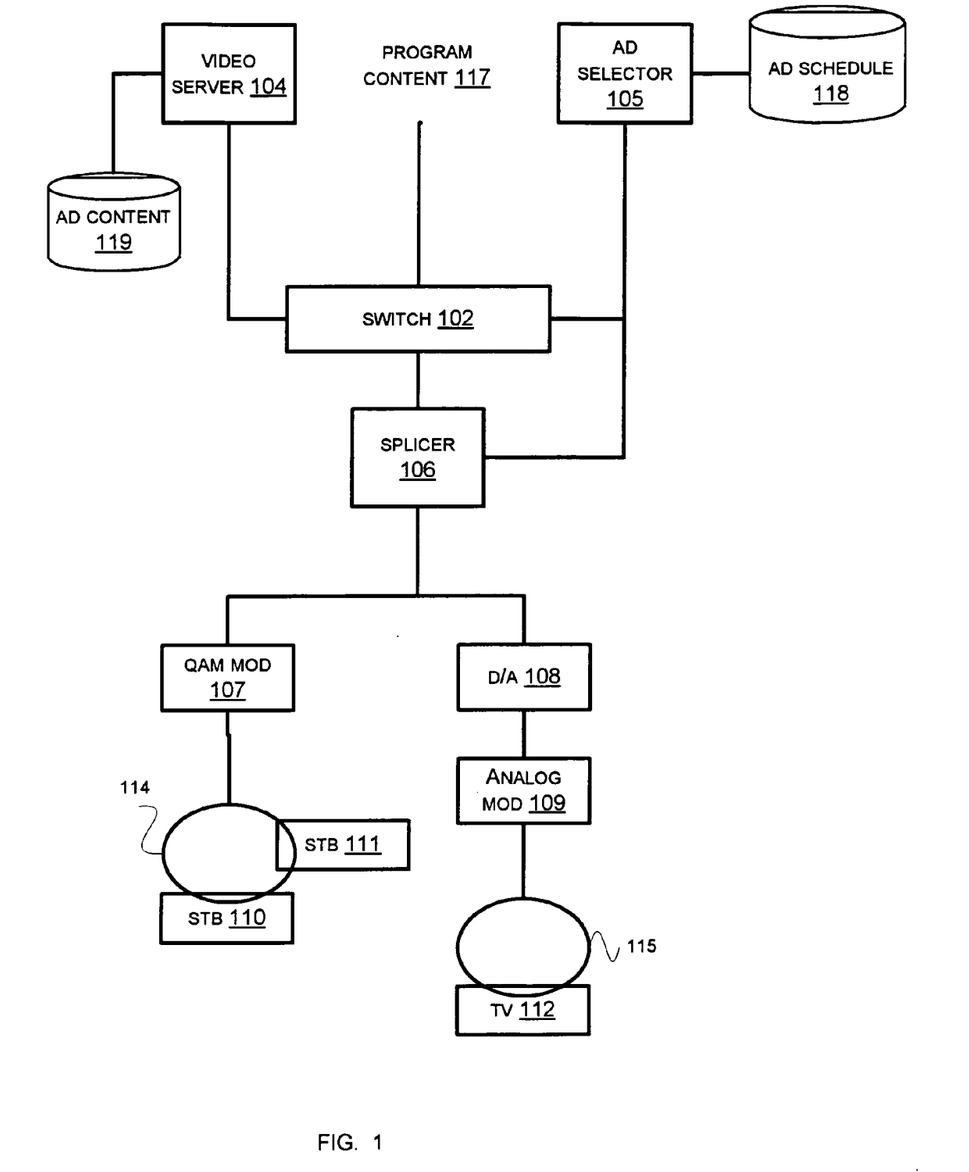
FIG. 1 is a block diagram of an embodiment of a digital program insertion (DPI) system.

FIG. 1 is a block diagram of an embodiment of a digital program insertion (DPI) system. Program content 117 which has been encoded from a programming provider feed, such as a feed for a channel of television programming, communicated, in this implementation, through a switch 102 to at least one splicer 106. A DPI system would typically have several such programming provider feeds, and may also have program content (such as video on demand program content) streaming from one or more video servers.

The splicer 106 recognizes that a program insertion point will soon occur in the programming stream, for example by identifying a SCTE-35 cue packet in an MPEG-2 stream, a DTMF tone sequence in a digital or analog audio channel, a GPI contact closure from the equipment such as a satellite receiver, or via some other ad insertion point indication. The splicer 106 contacts the ad selector 105 with a request indicating that an ad break is approaching for this program content 117, using an "ad needed" message such as a SCTE-30. In some implementations, the splicer 106 may send an "ad needed" message to the stream server 104 instead. The stream server 104 may then inform the ad selector 105 that an ad or ads should be selected for insertion into the program content 117. In some implementations, functions of the stream server 104 and the ad selector 105 may be incorporated into one physical device, such as a stream server with ad selection capability.

When the ad selector 105 receives an "ad needed" message, it may determine a channel, program, and/or other information associated with the message. The ad selector 105 may apply this information, and may also apply one or more ad schedules 118 and/or other information as part of the process of selecting an ad or ads. The ad selector 105 may identify one or several ads to be inserted into the content stream at the detected advertising break. For example, a two minute commercial break may typically be filled with four thirty-second ads. The ad selector 105 may interact with the splicer 106 and/or the stream server 104 (a.k.a. video server and/or ad server) to cause the selected advertisements to be inserted into the program stream at the ad break.

The stream server 104 may stream content files representing the selected ad or ads to the splicer 106, which may then spice (insert) the ad content into the program content. In some embodiments, the splicer 106 may also perform other functions, such as data modulation and stream multiplexing.

In the illustrated embodiment, the switch 102 provides communications connectivity between various system elements, including the stream server 104, the encoded program content stream 117, the ad selector 105, and the splicer 106. In some implementations, the switch 102 might include several networking elements, including Gigabit Ethernet, fiber networking connectivity, wireless networking switches, routers, buses, and/or other networking elements. Depending upon the implementation, some or all components may interact in ways that do not involve a switch 102.

The splicer 106 communicates one or more content streams with embedded advertising to analog and/or digital distribution network(s).

In some implementations, a communications network will provide connectivity to the distribution network(s). The distribution network(s) may use some of the same devices providing the connectivity to the splicer 106 such as the switch 102 previously discussed, or it may be distinct from those devices 102.

For analog distribution, a digital to analog converter 108 such as an MPEG-2 decoder may be employed. The resulting analog content stream may then be applied to one or more analog modulators 109 (e.g. to modulate and RF upconvert) prior to distribution to devices such as one or more televisions 112.

For digital distribution, a digital modulator such as a quadrature amplitude modulator (QAM) 107 may modulate and RF up-convert one or more digital content streams for distribution. Subscriber equipment such as set top boxes 110, 111 may receive the content stream. Some types of subscriber equipment may be particularly suited to receiving digital distribution, analog distribution, or both.

Various Implementations of Elements of a DPI System

Figure 2:
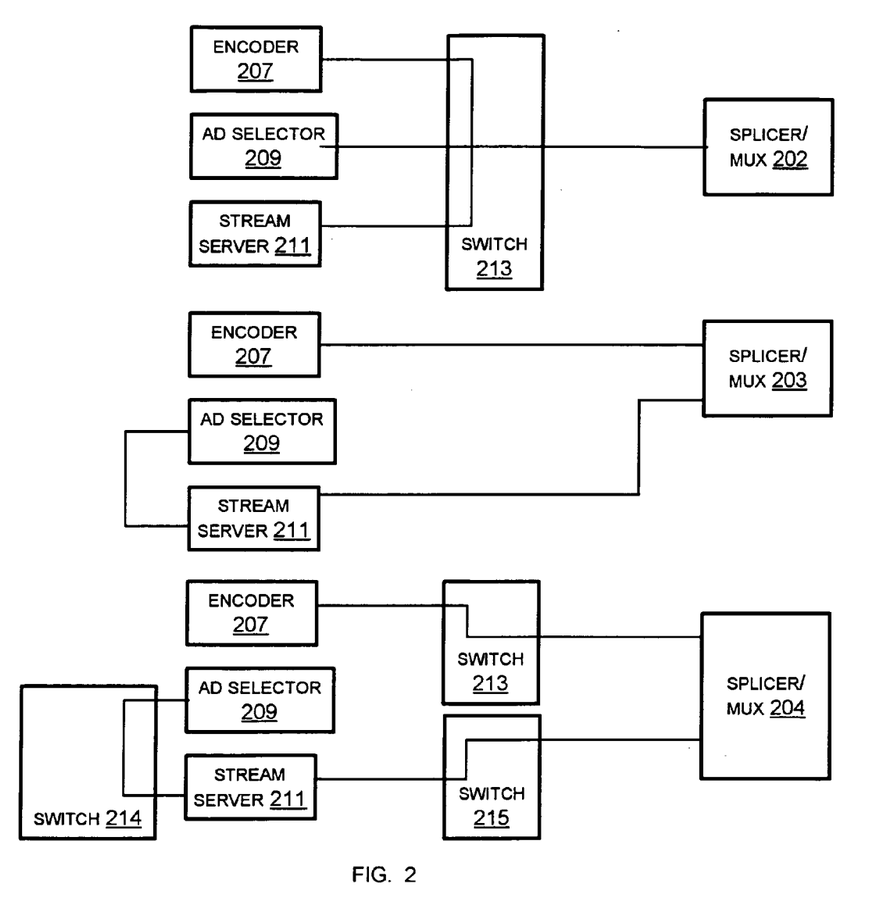
FIG. 2 is a block diagram of an embodiment of a various implementations of elements of a DPI system.

FIG. 2 is a block diagram of an embodiment of various implementations of elements of a DPI system. A video stream (such as for one or more television channels) is encoded into a digital content stream such as MPEG-2 by an encoder 207. The encoder may be located, for example, with the program creator, broadcast originator, or with the local content distributor (e.g. cable operator). The content stream is provided to a stream splicer/multiplexer 202 203 204. The splicer/multiplexer 202 203 204 recognizes a DPI insertion point (e.g. ad break indication) in the content stream or streams and communicates a need for one or more advertisements to an ad selector 209 or to a stream server 211. When the stream server 211 receives an "ad needed" message, it may communicates an indication to the ad selector 209. The ad selector 209 selects one or more ads. The stream server 211 streams the one or more ads to the splicer/multiplexer 202 203 204, which inserts them into the channel's content stream at the appropriate point.

The top implementation (I) of FIG. 2 illustrates communications connectivity for the DPI components using a switch 213, such as a Gigabit Ethernet switch. The switch 213 could involve various networking implementations as discussed in conjunction with FIG. 1.

The middle implementation (II) of FIG. 2 employs non-switched connectivity between the DPI components. In this implementation, the splicer 203 may communicate an "ad needed" message to the stream server 211, which interacts with the ad selector 209. Non-switched connectivity is provided between the encoder 207 and the splicer/multiplexer 203, and between the stream server 211 and the splicer/multiplexer 203.

The bottom implementation (III) of FIG. 2 employs separate communication paths or multiple networks via switches 214, 213, and 215. The separate communication paths or multiple networks support the high bandwidth requirements of streamed programming content from the programming encoders, distinctly from the high bandwidth requirements for streaming ad content from one or more stream servers. Separation of streaming content from headend information flows between the ad selector and the stream server also helps ensure that transitory bottlenecks do not result in delayed information flows. The splicer/multiplexer 204 may interface with both switch 213 and switch 215 to receive content and ad streams.

Signaling and Data Flow in Prior Art DPI Systems

Figure 3:
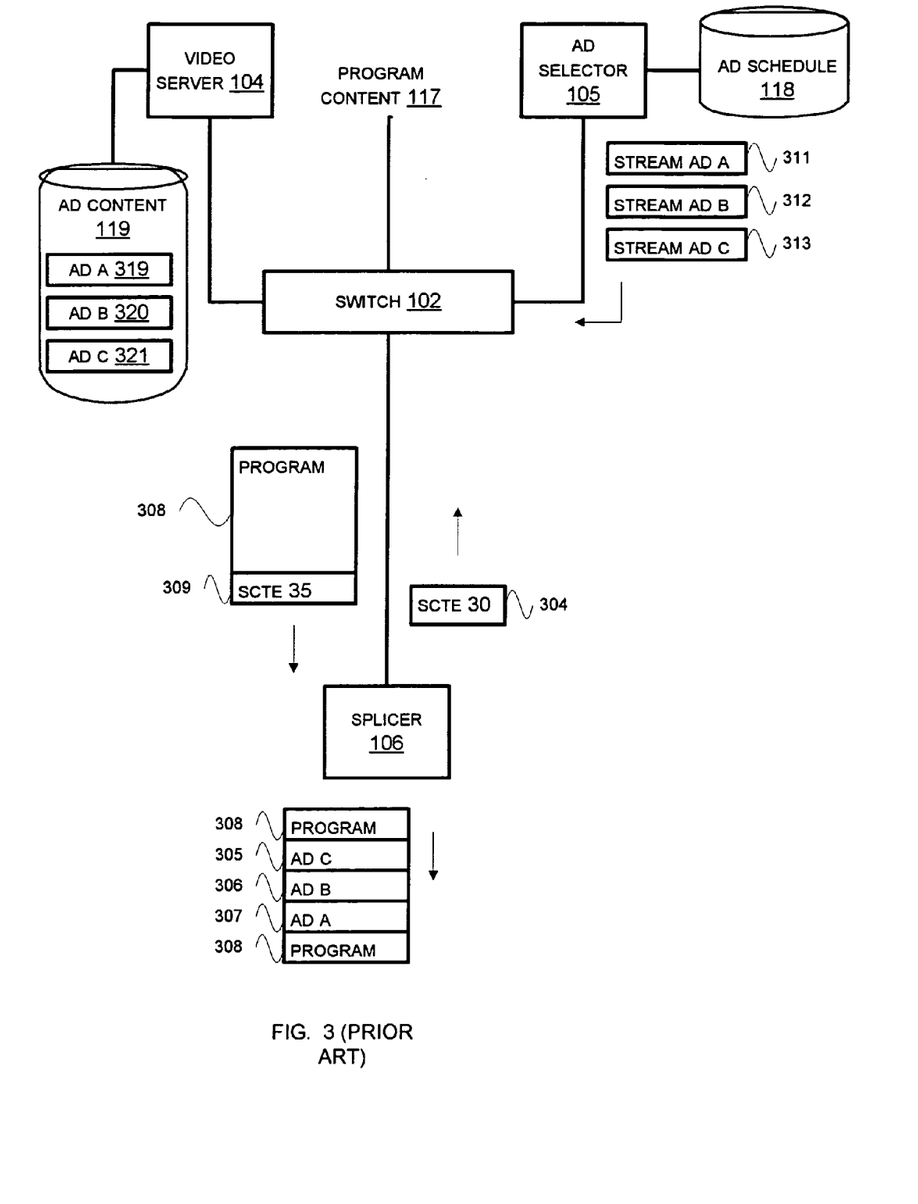
FIG. 3 is a block diagram of signaling and data flow in prior art DPI systems.

FIG. 3 is a block diagram of an embodiment of a signaling and data flow in one prior art embodiment of a DPI system. Encoded program content 117 is sent from an encoder to a splicer 106 using a switch 102. The program content 308 includes an "ad insertion point approaching" indication, in this case, an SCTE-35 (Society of Cable Television Engineers) cue packet 309 in an MPEG-2 stream. The splicer 106 responds by sending to either the ad selector 105 or the video server 104 an "ad needed" message, in this case an SCTE-30 message 304 indicating a point (e.g. a time, stream location, etc.) at which the ad break occurs in the stream and a length of the ad break. The switch delivers the SCTE-30 304 to either the ad selector 105 or the video server 104, depending on the implementation. In situations where the video server 104 receives the message, it may inform the ad selector 105 that an ad or ads are needed.

The ad selector 105 (or video server 104, depending on implementation) may reply to the splicer 106 via SCTE-30 message to indicate that the ad break indication message was received, and that the ad selector 105 is ready. The ad selector 105 (or video server 104) may notify the splicer 106 via an SCTE-30 message that it is about to stream the first ad; to which the splicer 106 may respond via an SCTE-30 indicating the splicer 106 received the message and is ready.

The ad selector 105 may, in some situations, examine one or more ad schedules 118 and/or other information sources, and based upon information therefrom select ads to provide in response to the request. In the illustrated example, three ads, AD A, AD B, and AD C, are selected for insertion into the programming stream at the detected insertion point. The ad selector 105 informs the video server 104 and/or the splicer 106 that three ads, A, B, and C, are to be inserted at the insertion point.

The video server 104 reads AD A content 319 from the ad content data base 119 and streams it to the splicer 106 as a single program transport stream (SPTS) 307. The video server 104 reads AD B content 320 and streams it to the splicer 106 as a SPTS 306. The video server 104 reads AD C content 321 and streams it to the splicer 106 as a SPTS 305.

The splicer 106 may provide two splice-progress indications to the ad selector 105 via SCTE-30 for each ad content stream, one at the beginning of the splicing process and one at the end. Thus, a total of six such progress indication messages may be generated for this example using three ad content streams.

Each ad is sent as a distinct SPTS, therefore there is substantial transactional overhead between the video server 104 and the splicer 106 to set up, maintain, and conclude each ad stream and splice. This overhead can be significant especially in high-traffic environments where timing and resource constraints can be critical.

The splicer 106 splices the individual ad streams into the content stream 308, producing a content stream 308 with embedded ad content 305 306 307.

Signaling and Data Flow in an Embodiment of a DPI System

Figure 4:
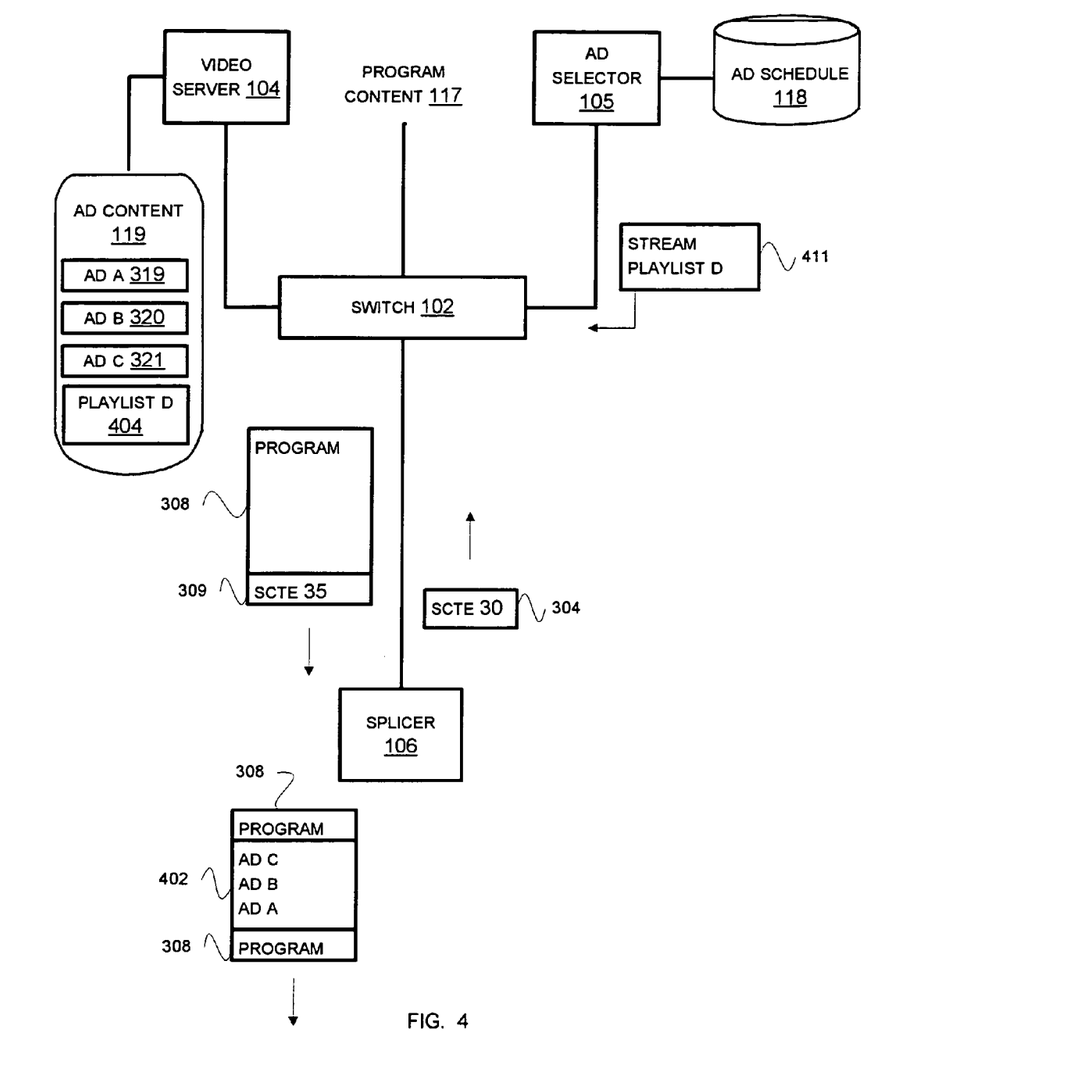
FIG. 4 is a block diagram of an embodiment of a signaling and data flow in an embodiment of a DPI system.

FIG. 4 is a block diagram of an embodiment of a signaling and data flow in an embodiment of a DPI system. Encoded program content 117 is provided to a splicer 106 via a switch 102. The program content 308 includes an "ad insertion point coming" message, in this case, an SCTE-35 cue packet 309. The splicer 106 responds by sending to the ad selector 105 and/or the video server 104 an "ad needed" message, which may be an SCTE-30 message 304. The switch delivers the SCTE-30 304 to the ad selector 105 and/or the video server 104. In situations where the video server 104 receives the message, it may inform the ad selector 105 that an ad or ads are needed.

The ad selector 105 may examine one or more ad schedules 118 and/or other information sources, and select ads based upon information therein. In the illustrated example, three ads, AD A, AD B, and AD C, are identified for insertion in the programming stream 117 at the detected insertion point. The ad selector 105 provides an indication 411 that causes a playlist D 404 to be generated for the three ads A, B, and C. The playlist D 404 includes indications (e.g. path names, Uniform Resource Locators, etc.) of the digital files comprising the content of the three ads. The ad selector 105 provides a signal 311 to the video server 104 and/or splicer 106 that playlist D 404 is to be streamed to satisfy the "ad needed" SCTE-30 304. From the perspective of the splicer, playlist D 404 is one content stream (e.g. a SPTS), comprising the content of ad A 319, content of ad B 320, and content of ad C 321.

The video server 104 may create one SPTS 402 for the content of the three ads. The video server 104 may stream, as a single SPTS 402, AD A content 319, AD B content 320, and AD C content 321 in response to an indication to stream the playlist D 404 to the splicer 106. Using a single SPTS 402 for the content of the three ads may reduce signaling overhead and result in more efficient system operation.

Thus, efficient DPI may be accomplished by detecting an ad insertion location in a digital program stream, and specifying at least one playlist as a file or files to splice into the digital program stream at the ad insertion location. In response to an indication to stream the playlist file or files, a Single Program Transport Stream may be streamed that includes content from multiple files referenced by the playlist file or files. These files may include the ad content to splice into the digital program stream at the ad insertion location.

Streaming a Single Program Transport Stream comprising content from multiple files referenced by the at least one playlist (henceforth, 'single-streaming') may include and/or involve streaming content from a first ad content file, then adjusting stream parameters of the SPTS such that a second ad content file is recognized as belonging to the SPTS. The content of the second file may then be streamed as part of the SPTS.

The SPTS may be spliced into a digital program stream at the ad insertion location, providing local advertising in a regionally, nationally, or internationally available program.

Ad break detection may include and/or involve detecting an SCTE-35 cue packet in the MPEG-2 stream, a DTMF tone sequence in a digital or analog audio channel, a GPI contact closure from the equipment such as a satellite receiver or some other ad insertion point signaling method.

Headend Operation

A DPI headend may include ad selection and stream serving logic, and may operate to identify a received signal as an indication that advertising content should be provided, and to determine ad content to provide in response to the signal. The headend may specify a playlist file as a file to provide the ad content, where the playlist file actually does not include any content, but instead includes identifications of multiple digital content files that do include the ad content. The multiple ad content files may be provided in response to the received signal as a SPTS.

Some implementations may involve creating nested playlists, e.g. a first playlist including at least one identification of a second playlist, where either or both of the first and second playlists include one or more identifications of ad content files.

Streaming the multiple content files as a SPTS (a.k.a. 'single-streaming') may include and/or involve signaling a stream splicer (also referred to as a stream multiplexer) with an identification of the playlist file, and receiving from the splicer a request to stream the playlist file, and in response providing to the splicer the SPTS including the ad content from the multiple digital content files.

There may be various manners of implementing single-streaming, including but not limited to identifying the playlist file as a source of the content of the SPTS, and streaming to a stream splicer the SPTS while drawing the ad content from the multiple digital content files. This could include and/or involve identifying the signal from the splicer as an MPEG SCTE-30 indication of an upcoming ad insertion location in a program stream, and/or creating the playlist file in response to the received signal.

One example of single-streaming involves modifications to a Program Association Table of a SPTS or Multiple Program Transport Stream (MPTS) being handled by a splicer. For example, a first ad content file may be streamed to the splicer; a second ad content file may be accessed and the Program Association Table adjusted so that content of the second file is recognized as belonging to the same program as the content of the first file. The second ad content file may then be streamed to the stream splicer.

Ad Selection

The ad content to provide in response to an ad break detection may be determined at least in part according to one or more of (a) a demographic and-or region exposed to a program stream associated with the signal, or (b) a time of day, day of week, season, holiday, exposure requirements, or other ad scheduling factors. Some implementations could include and/or involve one or more of (a) referencing one or more ad schedules for a program stream associated with the signal, or (b) referencing one or more ad schedules for a region and-or demographic exposed to the program stream associated with the signal.

Ad Stream Formats in a Prior Art DPI System

Figure 5:
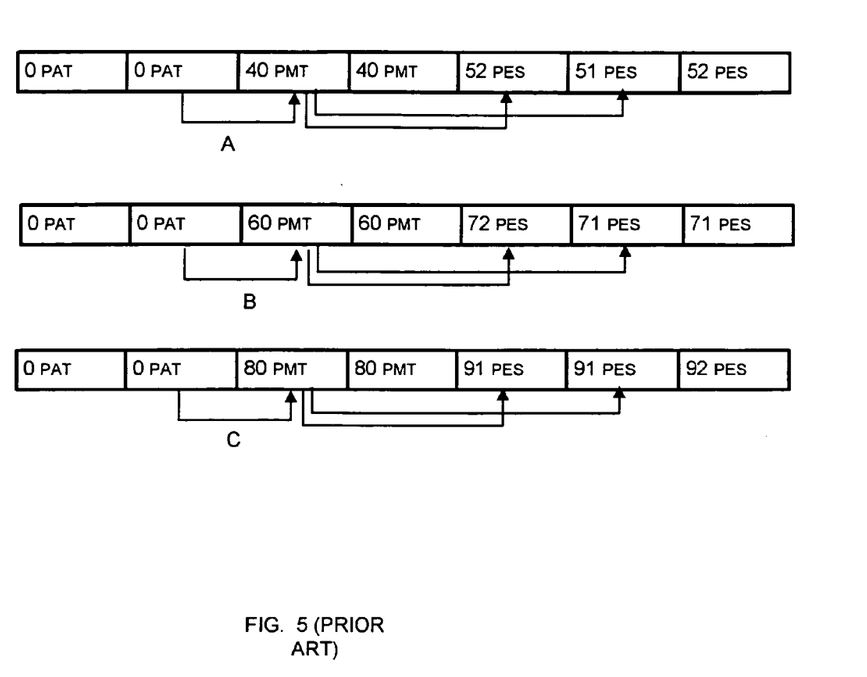
FIG. 5 is an illustration of ad stream formats in prior art DPI systems.

FIG. 5 is an illustration of an embodiment of ad stream formats in a prior art DPI system. The discussion which follows assumes the packet streams A, B, and C, are each a SPTS. However, the discussion would be equally valid if each packet stream A, B, and C were an MPTS. In the top illustration, packets of a SPTS for an AD "A" are shown. The numbers shown are the Program Identification (PID) numbers. The packet PIDs provide a way of identifying the type of packets in a programming stream. For MPTS, they also enable all packets for one programming stream to be identified.

The first two packets shown have a PID of 0 which indicates they contain a Program Association Table (PAT). One of the two PATs may be a "flush" PAT, which alerts the reader of the SPTS that a PAT containing new or changed information is coming. The second PAT contains a pointer (by identifying the PID), to the Program Map Table (PMT). In this case it identifies the PMT PID as 40.

In the MPTS, the PAT would still be sent, identifying the PMT for this program stream as having PID 40. However, that PAT would also contain information identifying the PMT PIDs for the other programs in the MPTS.

The next two packets shown have a PID of 0. These are PMT packets, as the preceding PAT indicated the PMT would be delivered with PID 40. The first PMT may be a "flush" PMT, which alerts the reader of the SPTS that new or changed PMT information is to follow in a second PMT. Inside the PMT, video packets for the program are identified as PID 52 and audio packets as PID 51. Video and audio packets are content packets, in Packetized Elementary Stream (PES) format.

In addition to the packets shown for ad content A, B, and C, the content streams will typically include many other PES packets.

The inclusion of flush PATs and PMTs in the content streams is optional.

The SPTS content stream for ad B comprises PID 0 PAT, PID 60 PMT, and PID 72 and 71 PES packets.

The SPTS content stream for ad C contains PID 0 PAT, PID 80 PMT, and PID 91 and 92 PES packets.

Ad Stream Formats in an Embodiment of a DPI System

Figure 6:
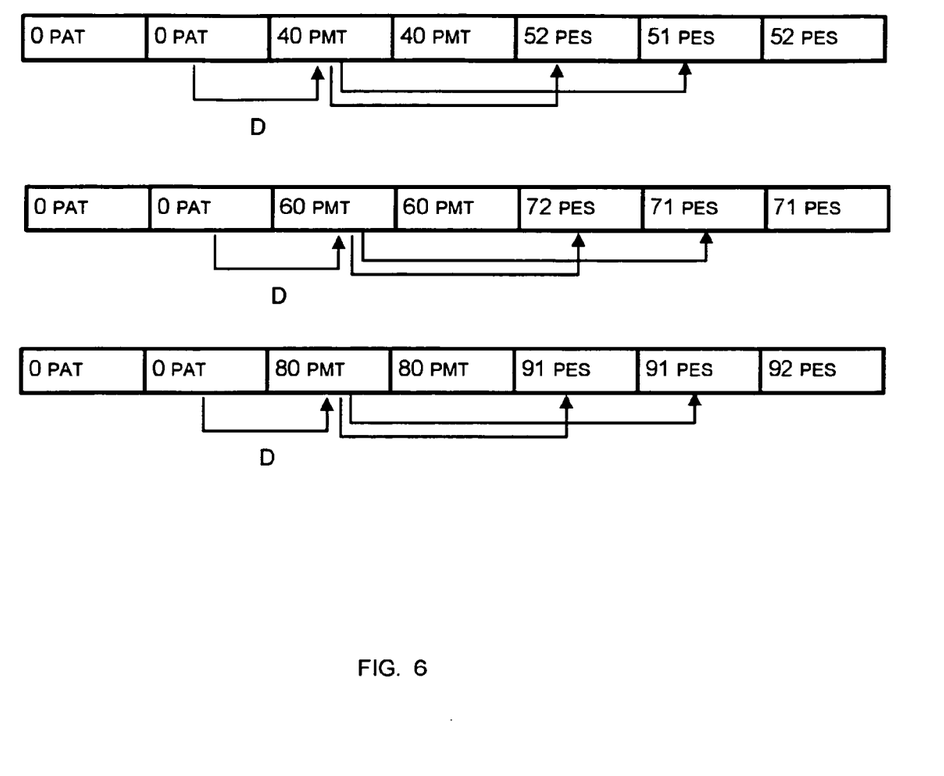
FIG. 6 is an illustration of an embodiment of ad stream formats in an embodiment of a DPI system.

FIG. 6 is an illustration of an embodiment of ad stream formats in an embodiment of a DPI system. All packets shown in FIG. 6 are part of one SPTS stream. From the standpoint of the receiver, such as a splicer, all packets are for a single content stream for an ad D. The top illustration shows packets used when program content for ad A is streamed. The packets include a PID 0 PAT, PID 40 PMT, and PID 51 and 52 PES. Many other packets would typically be present as well.

The point where streaming of content for ad A concludes, and streaming of content for ad B commences, is treated as a transition, and at least one PID 0 PAT packets are sent. The illustration for the ad B portion of the stream is shown in the middle illustration. The PAT identifies PID 60 as comprising the PMT, which indicates the PES packets will now be PID 71 and PID 72. A receiver of the SPTS reads these packets and identifies the PES packets for the SPTS as having PID 71 and PID 72. Although the receiver may recognize that a transition has occurred, this has the effect of a transition within the SPTS for ad D, not a new content stream.

Packets of the ad C content are shown in the lower illustration. PATs have PID 0, the PMT has PID 80, and the media PES packets have PIDs 91 and 92.

Transitions within the SPTS from the content of ad A to the content of ads B and ad C are accomplished by the adjusting the stream PAT packets with relatively low overhead, thus increasing DPI system efficiency.

Ad Insertion in a DPI System

Figure 7:
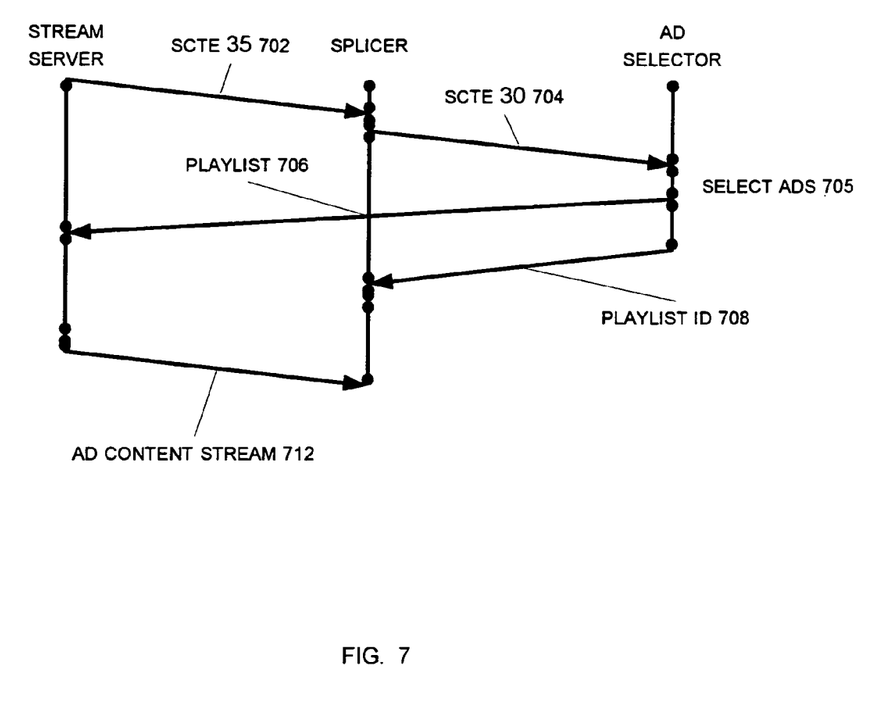
FIG. 7 is an action flow diagram of an embodiment of ad insertion in a DPI system.

FIG. 7 is an action flow diagram of an embodiment of ad insertion in a DPI system. In this diagram, it is assumed that at least one stream server (not necessarily the same one) is used to send both programming content and advertising content to the splicer. In some implementations, an encoder, separate from a stream server, may be streaming the program content (e.g. from a satellite feed, upstream content source via fiber, etc.)

At 702 a stream server (as mentioned, this could be a "live" feed encoder) sends an SCTE-35 as part of a stream, e.g. as an MPEG data PID, indicating an upcoming ad break in the stream.

The SCTE-35 is recognized by a receiving splicer. At 704, the splicer sends an SCTE-30, indicating the ad break, to an ad selector or ad server (e.g. stream server with ad selection capability). The ad selector may respond to the splicer with an indication that the message was received and that the ad selector is ready. At 705, the ad selector selects one or more ads to insert in response to the ad break. At 706, the ad selector informs the stream server of a playlist. The playlist identifies one or several ads to provide as a SPTS, e.g. representing a single ad content stream. Playlists may reference other playlists, or for example file paths and/or URLs identifying files comprising the content of the ads to insert at the ad break.

The ad selector may notify the splicer that the playlist file will be streamed to fill the ad break. This may be accomplished using SCTE-30 messages, or messages similar thereto. In some situations, the video server (stream server) may provide such notification to the splicer. The splicer may respond to the ad selector/server with an indication that it is ready to receive the playlist file stream, using an SCTE-30 message or one similar thereto. At 708, the ad selector provides a playlist identification to the splicer. At 712, the ad content is streaming from the stream server to the splicer. The stream to insert at the ad break, possibly including content from multiple ad content files, is received by the splicer as a single SPTS. The splicer may sends two splice-progress indications to the ad selector/server via SCTE-30, one at the beginning of the splice of the SPTS and one at the end. A substantial reduction in signaling overhead is thus accomplished over providing the ad content as three separate SPTSs. The ad selector/server may comprise logic to interpret the receipt of the second progress indication as an indication that the multiple ads were successfully spliced.

If the splicer comprises "playlist aware" logic, it may send two progress indications for each set of ad content of the SPTS (e.g. using PIDs or some other technique to identify the content of each ad within the SPTS). The splicer may comprise logic to receive from the ad selector/server information about the content of the playlist in order to make a determination of beginning and/or endpoints of particular ad content in the playlist. Substantial signaling overhead is obtained in this implementation as well, due to the reduced overhead of providing a single SPTS.

MPEG-2 Data Organization

Figure 8:
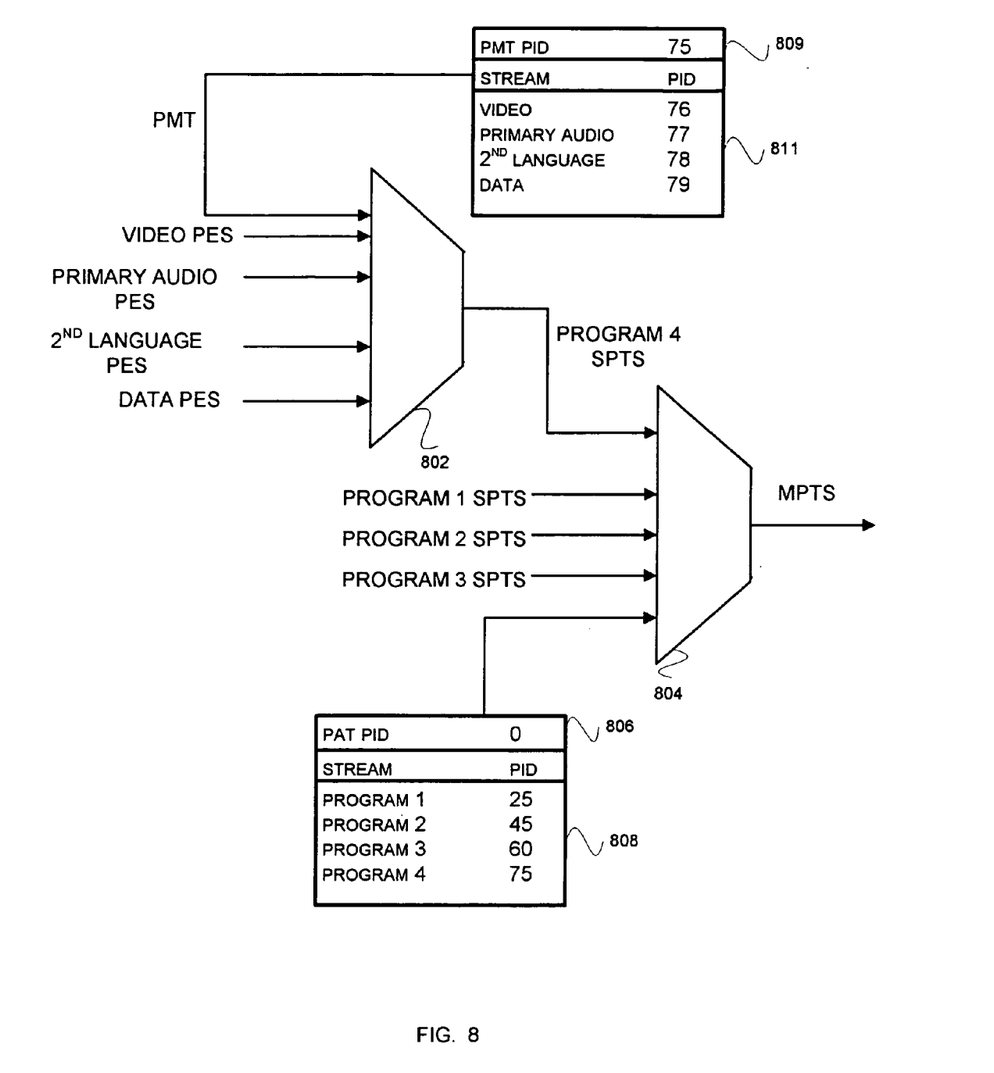
FIG. 8 is a block diagram of an embodiment of a MPEG-2 single-program transport stream (SPTS) and multi-program transport stream (MPTS).

FIG. 8 is a block diagram of an embodiment of the organization of MPEG-2 transport formats and program identifiers used by stream splicer/multiplexer and other transport equipment including encoders and decoders. Logic to carry out this organization may be included, at least in part, by a splicer and/or multiplexor, a digital modulator, an analog to digital converter, and/or an analog modulator, among some of the possible devices. Logic 802 combines control information, such as in a PMT, along with various PES packet streams to create a SPTS for a program stream, PROGRAM 4. In this example, PROGRAM 4 may comprise advertising content to splice into another program stream, such as PROGRAM 1. The PMT 811 for the ad content has a PID 809 with the value 75. The PMT 811 defines the video stream PES with PID 76, the audio stream with PID 77, and so on.

Logic 804 multiplexes each program content stream (SPTS 1, 2, 3, and 4) into a multiple program transport stream MPTS. The MPTS will have a PAT 808 having a PID 806 with a value of 0. The PAT 808 identifies PMTs of the MPTS. The logic 804 may modify this PAT within the MPTS in order to perform splicing of the ad content of the PROGRAM 4 SPTS and program content of the PROGRAM 1 SPTS (e.g. changing the PMT PID for PROGRAM 1 from 25 to 75 during the duration of an ad break in PROGRAM 1, then changing the PMT PID for PROGRAM 1 back to 25 after the ad break concludes).

Those having skill in the art will appreciate that there are various vehicles by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will require optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:
1. A method comprising:
   identifying a received signal as an indication that advertising content should be provided for insertion by a stream splicer into an output stream;
   determining ad content to provide in response to the signal;
   without modifying the output stream, specifying to the splicer a playlist file as a file to provide the ad content, the playlist file comprising identifications of multiple digital content files each comprising a separate advertisement; and streaming the multiple content files individually to a stream splicer as a Single Program Transport Stream and identifying the content from the multiple content files to the stream splicer as a single content segment.

2. The method of claim 1, wherein streaming the multiple content files as a Single Program Transport Stream further comprises:

signaling the stream splicer with an identification of the playlist file; receiving from the splicer a request to stream the playlist file; and in response providing to the splicer the Single Program Transport Stream comprising the ad content from the multiple digital content files as a single splice segment.

3. The method of claim 1, wherein streaming the multiple content files as a Single Program Transport Stream further comprises:

identifying the playlist file as a source of the content of the Single Program Transport Stream; and streaming to a stream splicer the Single Program Transport Stream while drawing the ad content from the multiple digital content files.

4. The method of claim 1, wherein identifying the received signal as an indication that advertising content should be provided further comprises:

identifying the signal as an MPEG SCTE-30 indication of an upcoming ad insertion location in a program stream.

5. The method of claim 1, wherein specifying a playlist file as a file to provide the ad content, the playlist file comprising identifications of multiple digital content files comprising the ad content further comprises:

creating the playlist file in response to the received signal; and identifying the ad content at least in part according to one or more of (a) a demographic and-or region exposed to a program stream associated with the signal, or (b) a time of day, day of week, season, holiday, or ad exposure requirements.

6. The method of claim 1, wherein determining ad content to provide in response to the signal further comprises:

one or more of (a) referencing one or more ad schedules for a program stream associated with the signal, or (b) referencing one or more ad schedules for a region and-or demographic exposed to the program stream associated with the signal.

7. The method of claim 1, wherein streaming the multiple content files as one Single Program Transport Stream further comprises:

accessing a first content file for a first ad and streaming content of the first content file to a stream splicer; accessing a second content file for a second ad; adjusting a Program Association Table so that content of the second file is recognized as belonging to the same Single Program Transport Stream as the content of the first file; and streaming content of the second content file to the stream splicer.

8. The method of claim 1, further comprising:

creating a first playlist comprising at least one identification of a second playlist, the second playlist comprising one or more identifications of content files comprising the ad content.

9. A method comprising:

detecting an ad insertion location in a digital program stream;

without modifying the digital program stream, specifying to a stream splicer at least one playlist as a file or files comprising ad content to splice into the digital program stream at the ad insertion location;

in response to an indication to stream the playlist file or files, individually streaming to a stream splicer a Single Program Transport Stream comprising content from multiple files referenced by the playlist file or files, the multiple files comprising the multiple ad content to splice into the digital program stream as a single content segment.

10. The method of claim 9, further comprising:

splicing the Single Program Transport Stream into the digital program stream at the ad insertion location.

11. The method of claim 9, wherein streaming a Single Program Transport Stream comprising content from multiple files referenced by the at least one playlist further comprises:

streaming content from a first file of the files comprising the ad content as the Single Program Transport Stream; adjusting stream parameters of the Single Program Transport Stream comprising the content from the first file such that a second file of the files comprising the ad content is recognized as belonging to the Single Program Transport Stream; and streaming content of the second file as part of the Single Program Transport Stream.

12. The method of claim 9, wherein detecting an ad insertion location in a digital program stream further comprises:

detecting an SCTE 35 queue packet in the digital program stream.

13. The method of claim 9, wherein detecting an ad insertion location in a digital program stream further comprises:

detecting a digitized DTMF tone in the digital program stream.

14. A system comprising:

an ad selector to identify a received signal as an indication that advertising content should be provided for a program stream, and to determine ad content to provide in response to the signal;

logic to generate a playlist file comprising identifications of multiple digital content files comprising the ad content and to identify the playlist file to a stream splicer without modifying the program stream; and a stream server adapted to stream the different multiple advertising content files to an ad splicer as a Single Program Transport Stream and to identify the content from the multiple advertising content files to the splicer as a single content segment.

15. The system of claim 14, wherein the stream server signals the stream splicer with an identification of the playlist file without modifying the program stream, receives from the splicer a request to stream the playlist file, and in response provides to the splicer the Single Program Transport Stream comprising the ad content from the multiple digital content files.

16. The system of claim 14, wherein the ad selector creates the playlist file in response to the received signal, and selects the ad content at least in part according to one or more of (a) a demographic and-or region exposed to a program stream associated with the signal, or (b) a time of day, day of week, season, holiday, or ad exposure requirements.

17. The system of claim 14, wherein the ad selector selects the ad content to provide in response to the signal at least in part by referencing one or more of (a ad schedules for a program stream associated with the signal, or (b) ad schedules for a region and-or demographic exposed to the program stream associated with the signal.

18. The system of claim 14, wherein the stream server accesses a first content file for a first ad and streams the content of the first content file to a stream splicer, accesses a second content file for a second ad, and adjusts a Program Association Table so that content of the second file is recognized as belonging to the same Single Program Transport Stream as the content of the first file, and streams content of the second content file to the stream splicer.

\* \* \* \* \*